(12) United States Patent
Yi

(10) Patent No.: US 11,310,012 B2
(45) Date of Patent: Apr. 19, 2022

(54) METHOD AND APPARATUS FOR GENERATING REFERENCE SIGNAL SEQUENCE IN WIRELESS COMMUNICATION SYSTEM

(71) Applicant: LG ELECTRONICS INC., Seoul (KR)

(72) Inventor: Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 65 days.

(21) Appl. No.: 16/646,131

(22) PCT Filed: Oct. 2, 2018

(86) PCT No.: PCT/KR2018/011690
§ 371 (c)(1),
(2) Date: Mar. 10, 2020

(87) PCT Pub. No.: WO2019/070099
PCT Pub. Date: Apr. 11, 2019

(65) Prior Publication Data
US 2020/0274669 A1 Aug. 27, 2020

Related U.S. Application Data

(60) Provisional application No. 62/567,126, filed on Oct. 2, 2017.

(51) Int. Cl.
*H04W 4/00* (2018.01)
*H04L 5/00* (2006.01)

(52) U.S. Cl.
CPC .................. *H04L 5/0048* (2013.01)

(58) Field of Classification Search
CPC ..................................................... H04L 5/0048
USPC .......................................................... 370/329
See application file for complete search history.

(56) References Cited

U.S. PATENT DOCUMENTS

2009/0238064 A1* 9/2009 Lee ..................... H04L 25/0226
370/208
2011/0249581 A1* 10/2011 Jen ......................... H04L 5/0035
370/252
2015/0003263 A1* 1/2015 Senarath ................ H04B 7/024
370/252

(Continued)

FOREIGN PATENT DOCUMENTS

CN 101682419 3/2010
CN 102215581 10/2011

OTHER PUBLICATIONS

European Patent Office Application Serial No. 18864115.3, Search Report dated Apr. 16, 2021, 9 pages.

(Continued)

*Primary Examiner* — Maharishi V Khirodhar
(74) *Attorney, Agent, or Firm* — Lee Hong Degerman Kang & Waimey

(57) ABSTRACT

A user equipment (UE) for receiving information on a length of a reference signal (RS) sequence and information on an offset of the RS sequence and performing an RS sequence mapping to map the RS sequence to a physical resource block 0 (PRB0) of the UE within a bandwidth part (BWP) based on the length of the RS sequence and the offset of the RS sequence. The UE also transmits, to the network, the RS sequence.

7 Claims, 12 Drawing Sheets

(56) References Cited

U.S. PATENT DOCUMENTS

| | | | | |
|---|---|---|---|---|
| 2015/0215856 | A1* | 7/2015 | Kim | H04W 24/08 |
| | | | | 370/252 |
| 2017/0187563 | A1 | 6/2017 | Shin et al. | |
| 2018/0343089 | A1* | 11/2018 | Park | H04L 5/0053 |
| 2019/0044601 | A1* | 2/2019 | Chang | H04L 5/0092 |
| 2020/0177334 | A1* | 6/2020 | Song | H04L 5/0048 |

OTHER PUBLICATIONS

PCT International Application No. PCT/KR2018/011690, International Search Report dated Jan. 10, 2019, 2 pages.

Samsung, "DL/UL Frequency Resource Allocation," 3GPP TSG WG1 Meeting #90, R1-1713635, Prague, Czechia, Aug. 21-25, 2017, 11 pages.

Qualcomm, "Remaining issues on NR DM-RS," 3GPP TSG RAN WG1 Meeting NR#3, R1-1716731, Nagoya, Japan, Sep. 18-21, 2017, 21 pages.

Huawei et al., "UL DMRS design for data transmission," 3GPP TSG RAN WG1 #90, R1-1712245, Prague, Czech Republic, Aug. 21-25, 2017, 7 pages.

Huawei et al. "WF on common PRB indexing," 3GPP TSG-RAN WG1 Meeting #90, R1-1715010, Prague, Czech Republic, Aug. 21-25, 2017, 5 pages.

Intel Corporation, "NR PBCH Design," 3GPP TSG RAN WG1 Meeting #90, R1-1715093, Prague, Czech Republic, Aug. 21-25, 2017, 15 pages.

The State Intellectual Property Office of the People's Republic of China Application Serial No. 201880063937.X, Office Action dated Jan. 12, 2022, 6 pages.

* cited by examiner

METHOD AND APPARATUS FOR GENERATING REFERENCE SIGNAL SEQUENCE IN WIRELESS COMMUNICATION SYSTEM

CROSS-REFERENCE TO RELATED APPLICATIONS

This application is the National Stage filing under 35 U.S.C. 371 of International Application No. PCT/KR2018/011690, filed on Oct. 2, 2018, which claims the benefit of U.S. Provisional Application No. 62/567,126, filed on Oct. 2, 2017, the contents of which are all hereby incorporated by reference herein in their entirety.

TECHNICAL FIELD

The present invention relates to wireless communications, and more particularly, to a method and apparatus for generating a reference signal (RS) sequence in a wireless communication system, specifically in a new radio access technology (RAT) system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

SUMMARY

It may be required to enhance a method for generating a reference signal (RS) sequence.

In an aspect, a method for generating a reference signal (RS) sequence by a user equipment (UE) in a wireless communication system is provided. The method includes receiving information on a length of the RS sequence and information on an offset of the RS sequence from a network, and generating the RS sequence based on the information on the length and the information on the offset.

In another aspect, a user equipment (UE) in a wireless communication system is provided. The UE includes a memory, a transceiver, and a processor, operably coupled to the memory and the transceiver, that controls the transceiver to receive information on a length of a reference signal (RS) sequence and information on an offset of the RS sequence from a network, and generates the RS sequence based on the information on the length and the information on the offset.

In another aspect, a method for receiving a reference signal (RS) sequence by a base station (BS) in a wireless communication system is provided. The method includes transmitting information on a length of the RS sequence and information on an offset of the RS sequence to a user equipment (UE), and receiving the RS sequence, which is generated based on the information on the length and the information on the offset, from the UE.

RS sequence can be generated based on configured length and/or offset of the RS sequence, instead of common PRB indexing. Signaling overhead can be avoided, and network flexibility can be supported.

DETAILED DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

Figure 1:
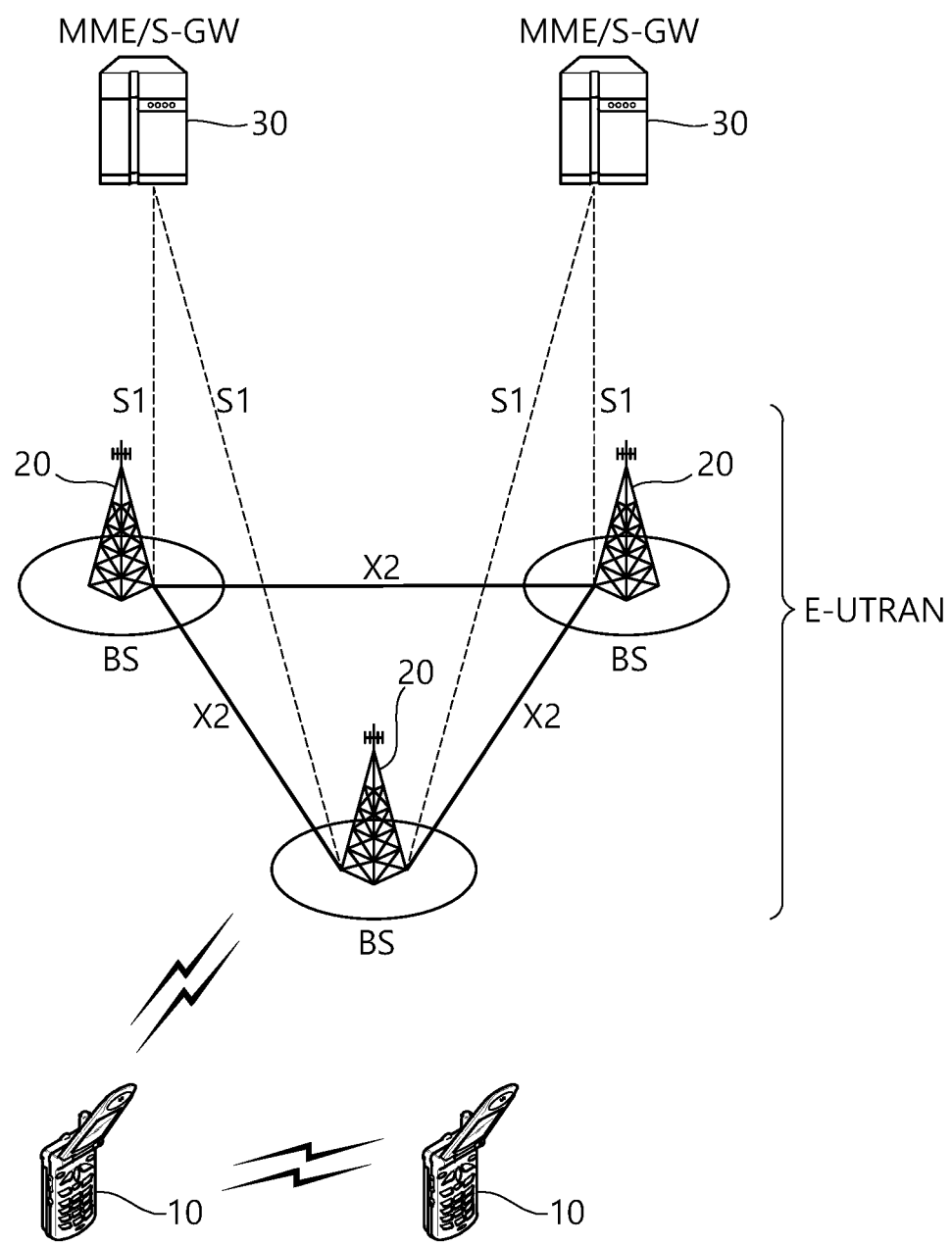
FIG. 1 shows an example of a wireless communication system to which technical features of the present invention can be applied.

FIG. 1 shows an example of a wireless communication system to which technical features of the present invention can be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMEs/S-GWs and BSs.

Figure 2:
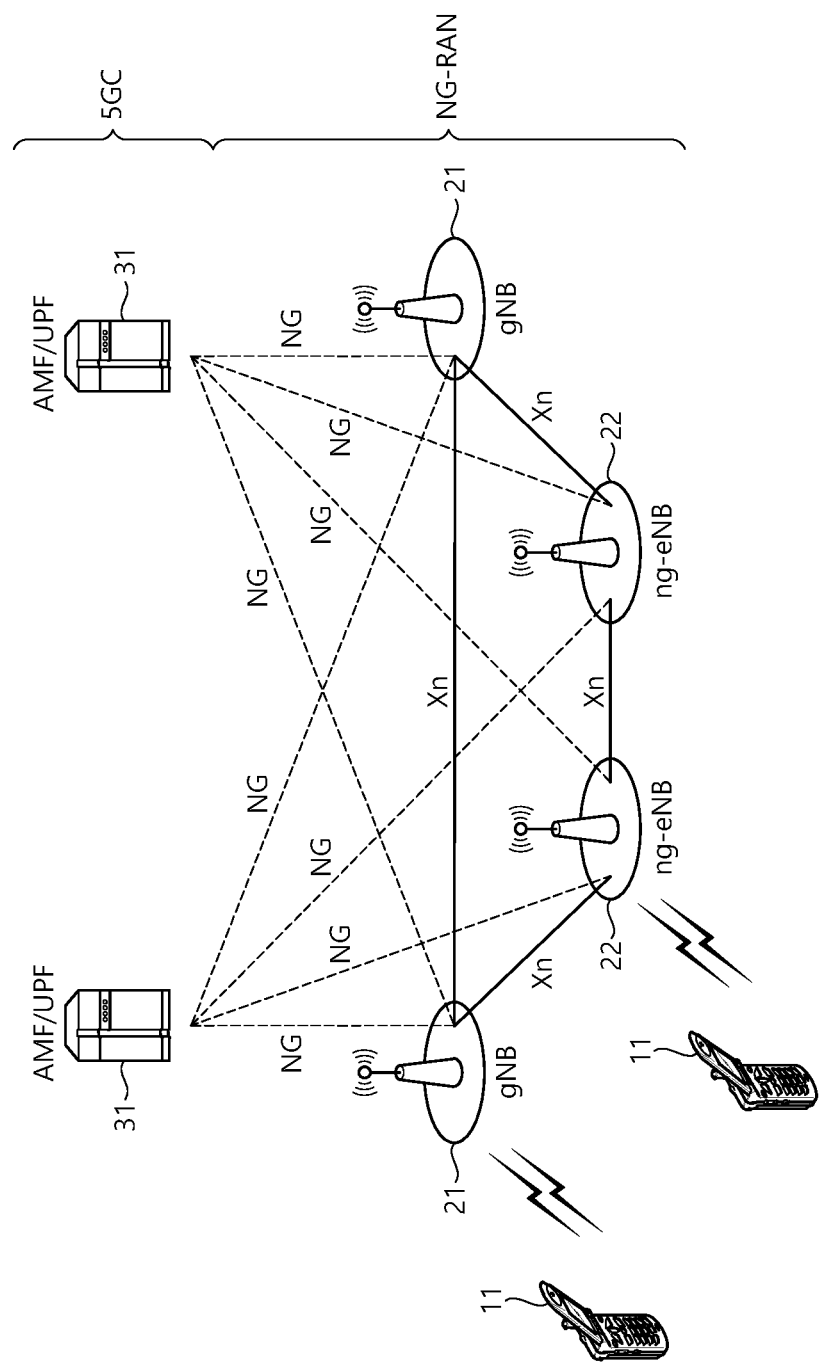
FIG. 2 shows another example of a wireless communication system to which technical features of the present invention can be applied.

FIG. 2 shows another example of a wireless communication system to which technical features of the present invention can be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 10 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A structure of a radio frame in NR is described. In LTE/LTE-A, one radio frame consists of 10 subframes, and one subframe consists of 2 slots. A length of one subframe may be 1 ms, and a length of one slot may be 0.5 ms. Time for transmitting one transport block by higher layer to physical layer (generally over one subframe) is defined as a transmission time interval (TTI). A TTI may be the minimum unit of scheduling.

Unlike LTE/LTE-A, NR supports various numerologies, and accordingly, the structure of the radio frame may be varied. NR supports multiple subcarrier spacings in frequency domain. Table 1 shows multiple numerologies supported in NR. Each numerology may be identified by index

TABLE 1

| $\mu$ | Subcarrier spacing (kHz) | Cyclic prefix | Supported for data | Supported for synchronization |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Referring to Table 1, a subcarrier spacing may be set to any one of 15, 30, 60, 120, and 240 kHz, which is identified by index $\mu$. However, subcarrier spacings shown in Table 1 are merely exemplary, and specific subcarrier spacings may be changed. Therefore, each subcarrier spacing (e.g. $\mu=0,1 \ldots 4$) may be represented as a first subcarrier spacing, a second subcarrier spacing . . . Nth subcarrier spacing.

Referring to Table 1, transmission of user data (e.g. physical uplink shared channel (PUSCH), physical downlink shared channel (PDSCH)) may not be supported depending on the subcarrier spacing. That is, transmission of user data may not be supported only in at least one specific subcarrier spacing (e.g. 240 kHz).

In addition, referring to Table 1, a synchronization channel (e.g. a primary synchronization signal (PSS), a secondary synchronization signal (SSS), a physical broadcast channel (PBCH)) may not be supported depending on the subcarrier spacing. That is, the synchronization channel may not be supported only in at least one specific subcarrier spacing (e.g. 60 kHz).

In NR, a number of slots and a number of symbols included in one radio frame/subframe may be different according to various numerologies, i.e. various subcarrier spacings. Table 2 shows an example of a number of OFDM symbols per slot, slots per radio frame, and slots per subframe for normal cyclic prefix (CP).

TABLE 2

| μ | Number of symbols per slot | Number of slots per radio frame | Number of slots per subframe |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Referring to Table 2, when a first numerology corresponding to u=0 is applied, one radio frame includes 10 subframes, one subframe corresponds to one slot, and one slot consists of 14 symbols. In the present specification, a symbol refers to a signal transmitted during a specific time interval. For example, a symbol may refer to a signal generated by OFDM processing. That is, a symbols in the present specification may refer to an OFDM/OFDMA symbol, or SC-FDMA symbol, etc. A CP may be located between each symbol.

Figure 3:
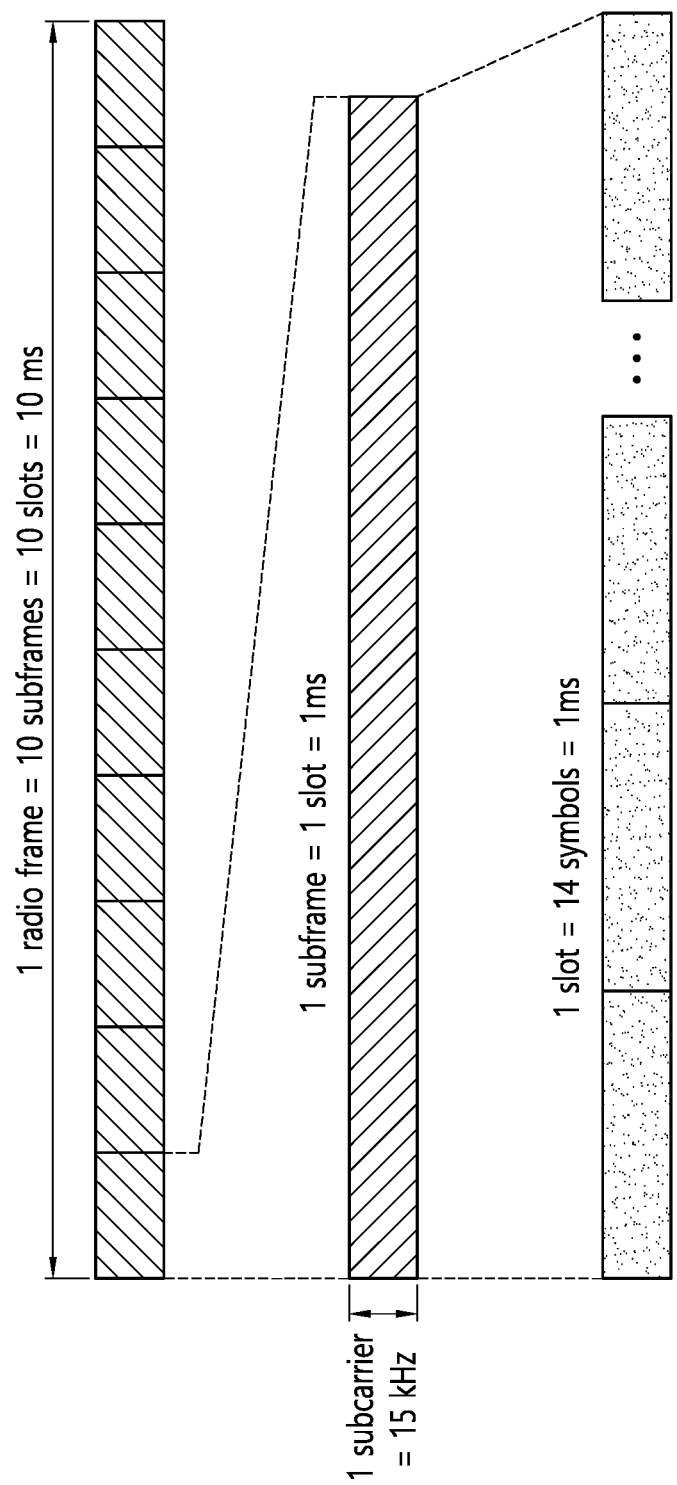
FIG. 3 shows an example of a frame structure to which technical features of the present invention can be applied. I

FIG. 3 shows an example of a frame structure to which technical features of the present invention can be applied. In FIG. 3, a subcarrier spacing is 15 kHz, which corresponds to μ=0.

Figure 4:
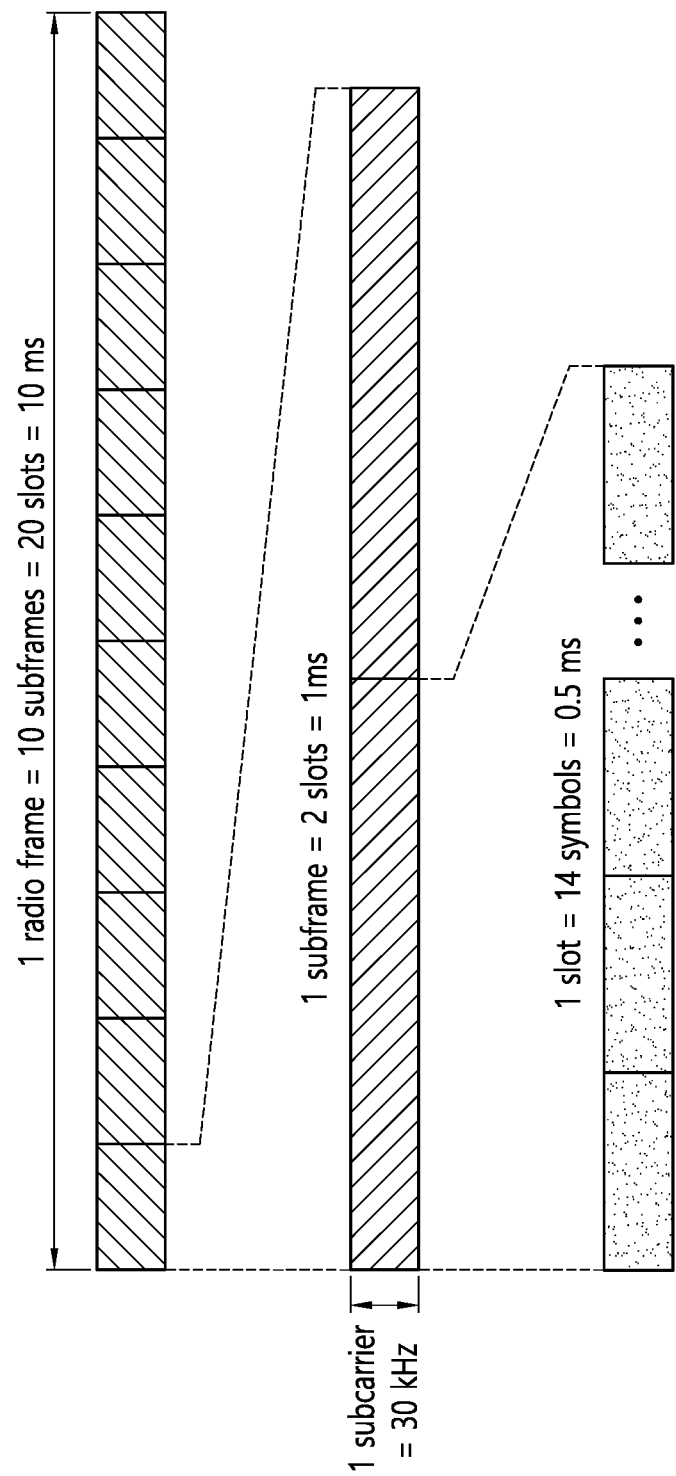
FIG. 4 shows another example of a frame structure to which technical features of the present invention can be applied.

FIG. 4 shows another example of a frame structure to which technical features of the present invention can be applied. In FIG. 4, a subcarrier spacing is 30 kHz, which corresponds to μ=1.

Table 3 shows an example of a number of OFDM symbols per slot, slots per radio frame, and slots per subframe for extended CP.

TABLE 3

| μ | Number of symbols per slot | Number of slots per radio frame | Number of slots per subframe |
|---|---|---|---|
| 2 | 12 | 40 | 4 |

Meanwhile, a frequency division duplex (FDD) and/or a time division duplex (TDD) may be applied to a wireless system to which an embodiment of the present invention is applied. When TDD is applied, in LTE/LTE-A, UL subframes and DL subframes are allocated in units of subframes.

In NR, symbols in a slot may be classified as a DL symbol (denoted by D), a flexible symbol (denoted by X), and a UL symbol (denoted by U). In a slot in a DL frame, the UE shall assume that DL transmissions only occur in DL symbols or flexible symbols. In a slot in an UL frame, the UE shall only transmit in UL symbols or flexible symbols.

Table 4 shows an example of a slot format which is identified by a corresponding format index. The contents of the Table 4 may be commonly applied to a specific cell, or may be commonly applied to adjacent cells, or may be applied individually or differently to each UE.

TABLE 4

| | Symbol number in a slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| ... | ... | ... | ... | ... | ... | ... | ... | ... | ... | ... | ... | ... | ... | ... |

For convenience of explanation, Table 4 shows only a part of the slot format actually defined in NR. The specific allocation scheme may be changed or added.

The UE may receive a slot format configuration via a higher layer signaling (i.e. radio resource control (RRC) signaling). Or, the UE may receive a slot format configuration via downlink control information (DCI) which is received on PDCCH. Or, the UE may receive a slot format configuration via combination of higher layer signaling and DCI.

Figure 5:
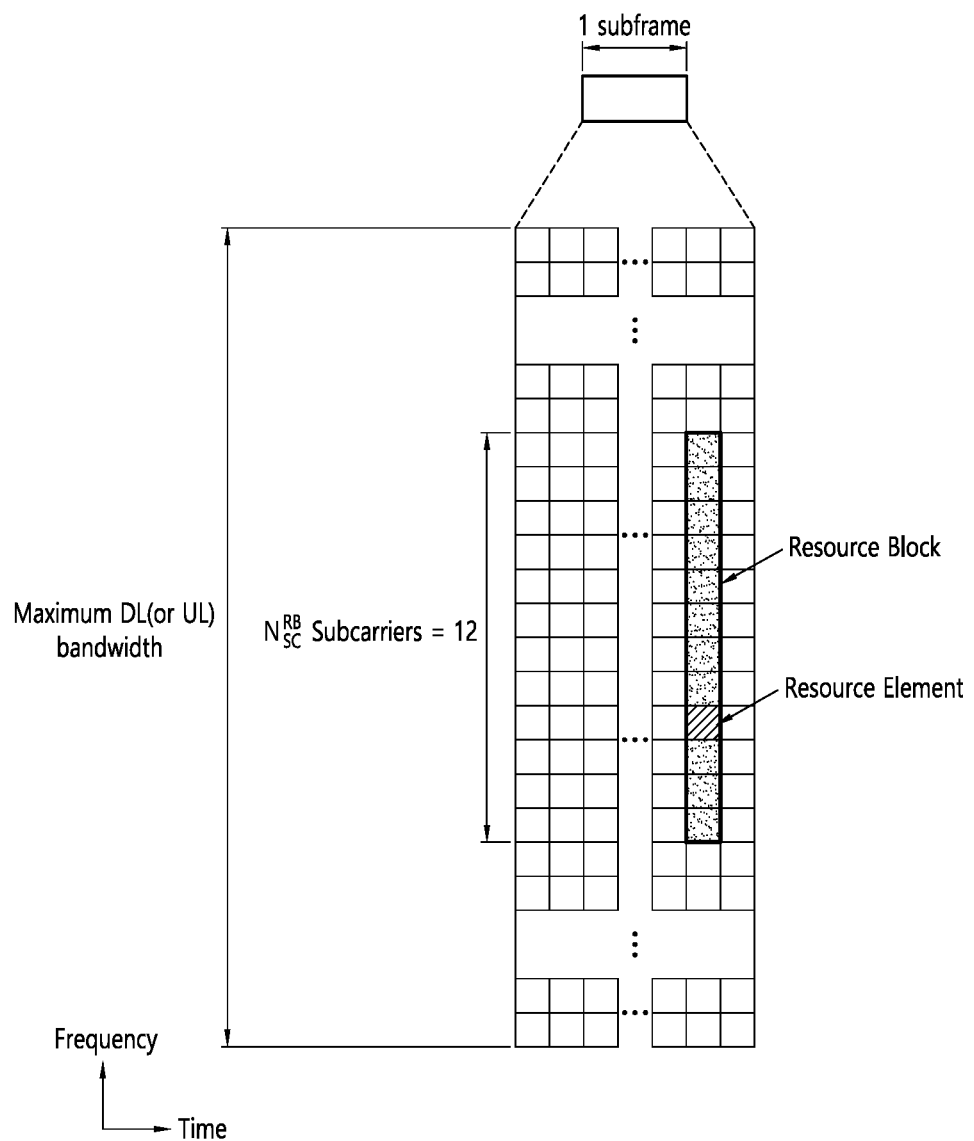
FIG. 5 shows an example of a resource grid to which technical features of the present invention can be applied.

FIG. 5 shows an example of a resource grid to which technical features of the present invention can be applied. An example shown in FIG. 5 is a time-frequency resource grid used in NR. An example shown in FIG. 5 may be applied to UL and/or DL. Referring to FIG. 5, multiple slots are included within one subframe on the time domain. Specifically, when expressed according to the value of "μ", "14·2" symbols may be expressed in the resource grid. Also, one resource block (RB) may occupy 12 consecutive subcarriers. One RB may be referred to as a physical resource block (PRB), and 12 resource elements (REs) may be included in each PRB. The number of allocatable RBs may be determined based on a minimum value and a maximum value. The number of allocatable RBs may be configured individually according to the numerology ("μ"). The number of allocatable RBs may be configured to the same value for UL and DL, or may be configured to different values for UL and DL.

A cell search scheme in NR is described. The UE may perform cell search in order to acquire time and/or frequency synchronization with a cell and to acquire a cell identifier (ID). Synchronization channels such as PSS, SSS, and PBCH may be used for cell search.

Figure 6:
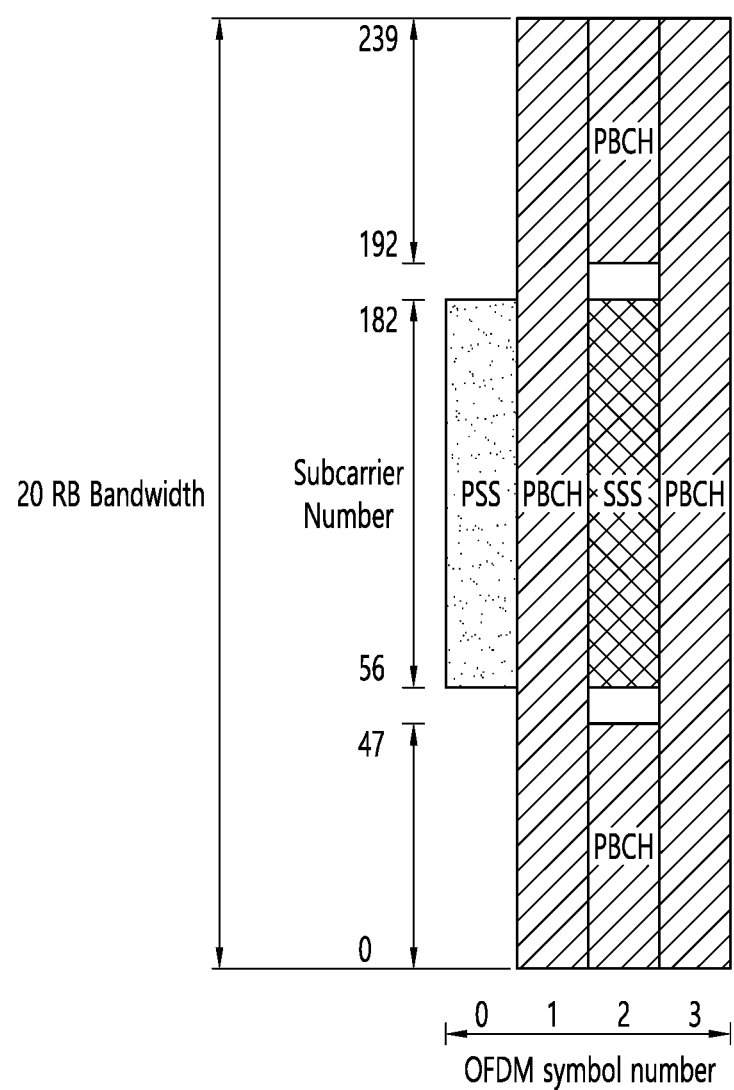
FIG. 6 shows an example of a synchronization channel to which technical features of the present invention can be applied.

FIG. 6 shows an example of a synchronization channel to which technical features of the present invention can be applied. Referring to FIG. 6, the PSS and SSS may include one symbol and 127 subcarriers. The PBCH may include 3 symbols and 240 subcarriers.

The PSS is used for synchronization signal/PBCH block (SSB) symbol timing acquisition. The PSS indicates 3 hypotheses for cell ID identification. The SSS is used for cell ID identification. The SSS indicates 336 hypotheses. Consequently, 1008 physical layer cell IDs may be configured by the PSS and the SSS.

The SSB block may be repeatedly transmitted according to a predetermined pattern within the 5 ms window. For example, when L SSB blocks are transmitted, all of SSB #1 through SSB # L may contain the same information, but may be transmitted through beams in different directions. That is, quasi co-located (QCL) relationship may not be applied to the SSB blocks within the 5 ms window. The beams used to receive the SSB block may be used in subsequent operations between the UE and the network (e.g. random access operations). The SSB block may be repeated by a specific period. The repetition period may be configured individually according to the numerology.

Referring to FIG. 6, the PBCH has a bandwidth of 20 RBs for the 2nd/4th symbols and 8 RBs for the 3rd symbol. The PBCH includes a demodulation reference signal (DM-RS) for decoding the PBCH. The frequency domain for the DM-RS is determined according to the cell ID. Unlike LTE/LTE-A, since a cell-specific reference signal (CRS) is not defined in NR, a special DM-RS is defined for decoding the PBCH (i.e. PBCH-DMRS). The PBCH-DMRS may contain information indicating an SSB index.

The PBCH performs various functions. For example, the PBCH may perform a function of broadcasting a master information block (MIB). System information (SI) is divided into a minimum SI and other SI. The minimum SI may be divided into MIB and system information block type-1 (SIB1). The minimum SI excluding the MIB may be referred to as a remaining minimum SI (RMSI). That is, the RMSI may refer to the SIB1.

The MIB includes information necessary for decoding SIB1. For example, the MIB may include information on a subcarrier spacing applied to SIB1 (and MSG 2/4 used in the random access procedure, other SI), information on a frequency offset between the SSB block and the subsequently transmitted RB, information on a bandwidth of the PDCCH/SIB, and information for decoding the PDCCH (e.g. information on search-space/control resource set (CORESET)/DM-RS, etc., which will be described later). The MIB may be periodically transmitted, and the same information may be repeatedly transmitted during 80 ms time interval. The SIB1 may be repeatedly transmitted through the PDSCH. The SIB1 includes control information for initial access of the UE and information for decoding another SIB.

PDCCH decoding in NR is described. The search space for the PDCCH corresponds to an area in which the UE performs blind decoding on the PDCCH. In LTE/LTE-A, the search space for the PDCCH is divided into a common search space (CSS) and a UE-specific search space (USS). The size of each search space and/or the size of a control channel element (CCE) included in the PDCCH are determined according to the PDCCH format.

In NR, a resource-element group (REG) and a CCE for the PDCCH are defined. In NR, the concept of CORESET is defined. Specifically, one REG corresponds to 12 REs, i.e. one RB transmitted through one OFDM symbol. Each REG includes a DM-RS. One CCE includes a plurality of REGs (e.g. 6 REGs). The PDCCH may be transmitted through a resource consisting of 1, 2, 4, 8, or 16 CCEs. The number of CCEs may be determined according to the aggregation level. That is, one CCE when the aggregation level is 1, 2 CCEs when the aggregation level is 2, 4 CCEs when the aggregation level is 4, 8 CCEs when the aggregation level is 8, 16 CCEs when the aggregation level is 16, may be included in the PDCCH for a specific UE.

The CORESET may be defined on 1/2/3 OFDM symbols and multiple RBs. In LTE/LTE-A, the number of symbols used for the PDCCH is defined by a physical control format indicator channel (PCFICH). However, the PCFICH is not used in NR. Instead, the number of symbols used for the COREST may be defined by the RRC message (and/or PBCH/SIB1). Also, in LTE/LTE-A, since the frequency bandwidth of the PDCCH is the same as the entire system bandwidth, so there is no signaling regarding the frequency bandwidth of the PDCCH. In NR, the frequency domain of the CORESET may be defined by the RRC message (and/or PBCH/SIB1) in a unit of RB.

In NR, the search space for the PDCCH is divided into CSS and USS. Since the USS may be indicated by the RRC message, an RRC connection may be required for the UE to decode the USS. The USS may include control information for PDSCH decoding assigned to the UE.

Since the PDCCH needs to be decoded even when the RRC configuration is not completed, CSS should also be defined. For example, CSS may be defined when a PDCCH for decoding a PDSCH that conveys SIB1 is configured or when a PDCCH for receiving MSG 2/4 is configured in a random access procedure. Like LTE/LTE-A, in NR, the PDCCH may be scrambled by a radio network temporary identifier (RNTI) for a specific purpose.

A resource allocation scheme in NR is described. In NR, a specific number (e.g. up to 4) of bandwidth parts (BPWs) may be defined. A BWP (or carrier BWP) is a set of consecutive PRBs, and may be represented by a consecutive subsets of common RBs (CRBs). Each RB in the CRB may be represented by CRB1, CRB2, etc., beginning with CRB0.

Figure 7:
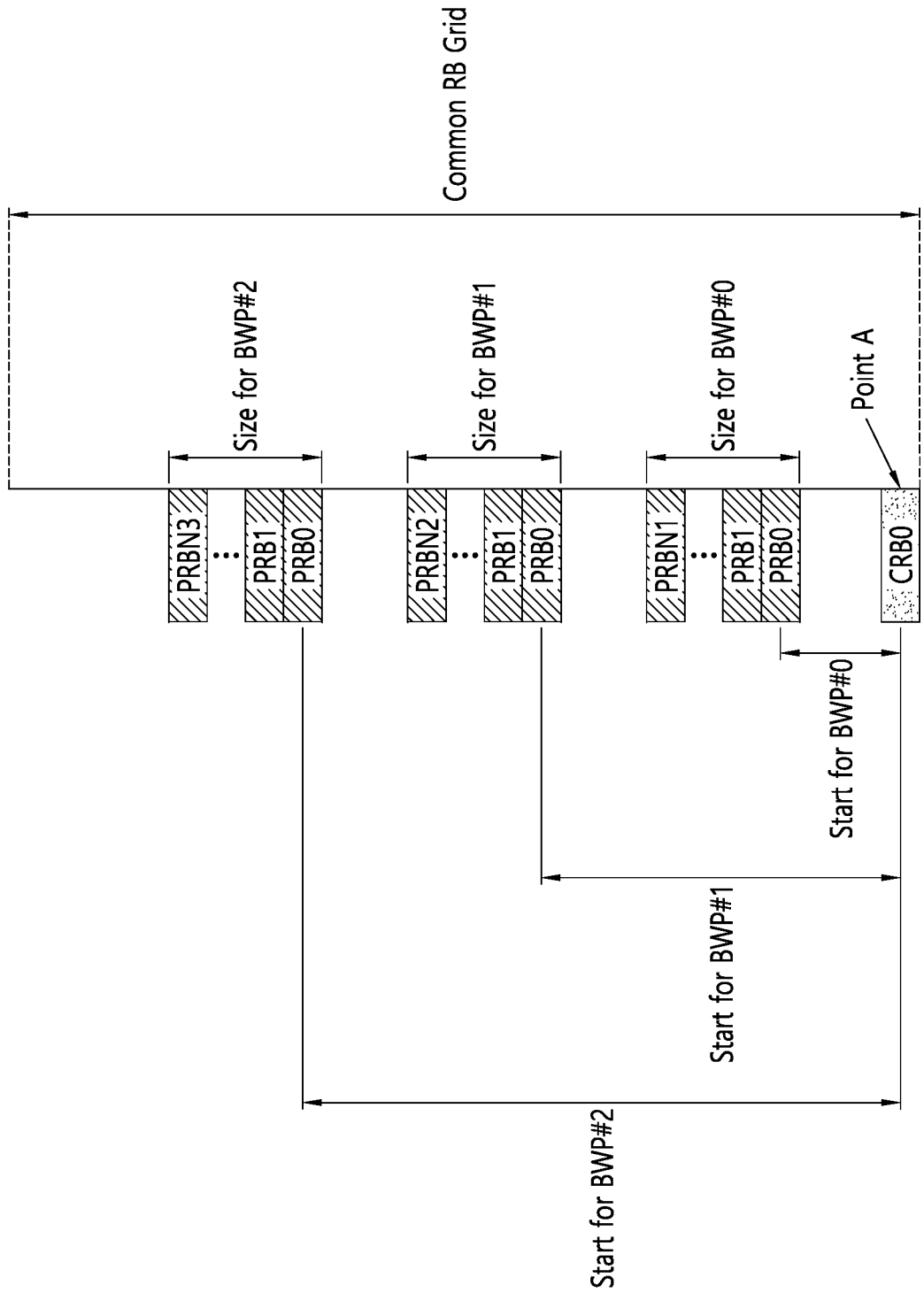
FIG. 7 shows an example of a frequency allocation scheme to which technical features of the present invention can be applied.

FIG. 7 shows an example of a frequency allocation scheme to which technical features of the present invention can be applied. Referring to FIG. 7, multiple BWPs may be defined in the CRB grid. A reference point of the CRB grid (which may be referred to as a common reference point, a starting point, etc.) is referred to as so-called "point A" in NR. The point A is indicated by the RMSI (i.e. SIB1). Specifically, the frequency offset between the frequency band in which the SSB block is transmitted and the point A may be indicated through the RMSI. The point A corresponds to the center frequency of the CRB0. Further, the point A may be a point at which the variable "k" indicating the frequency band of the RE is set to zero in NR. The multiple BWPs shown in FIG. 7 is configured to one cell (e.g. primary cell (PCell)). A plurality of BWPs may be configured for each cell individually or commonly.

Referring to FIG. 7, each BWP may be defined by a size and starting point from CRB0. For example, the first BWP, i.e. BWP #0, may be defined by a starting point through an offset from CRB0, and a size of the BWP #0 may be determined through the size for BWP #0.

A specific number (e.g., up to four) of BWPs may be configured for the UE. At a specific time point, only a specific number (e.g. one) of BWPs may be active per cell. The number of configurable BWPs or the number of activated BWPs may be configured commonly or individually for UL and DL. The UE can receive PDSCH, PDCCH and/or channel state information (CSI) RS only on the active DL BWP. Also, the UE can transmit PUSCH and/or physical uplink control channel (PUCCH) only on the active UL BWP.

Figure 8:
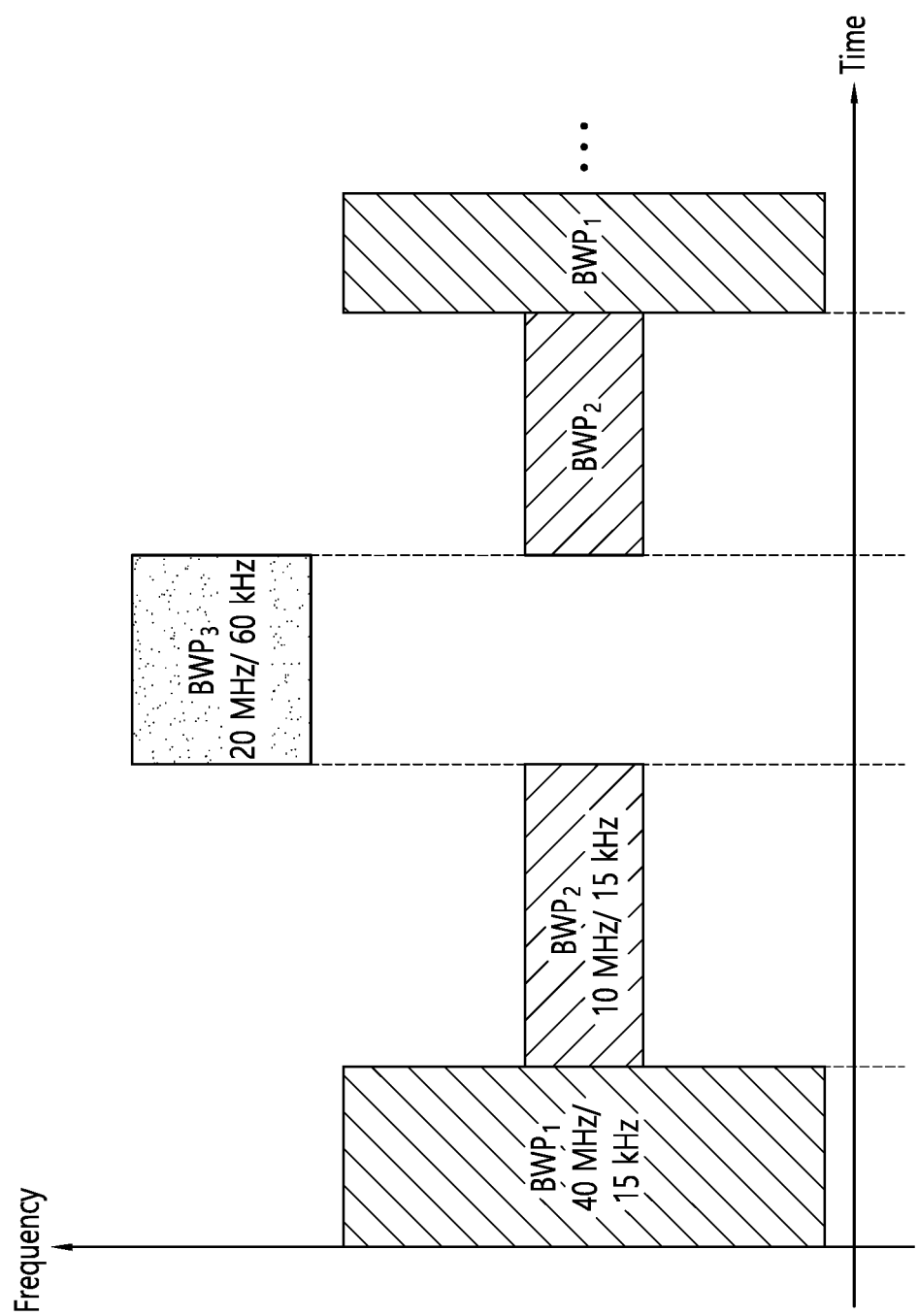
FIG. 8 shows an example of multiple BWPs to which technical features of the present invention can be applied.

FIG. 8 shows an example of multiple BWPs to which technical features of the present invention can be applied. Referring to FIG. 8, 3 BWPs may be configured. The first BWP may span 40 MHz band, and a subcarrier spacing of 15 kHz may be applied. The second BWP may span 10 MHz band, and a subcarrier spacing of 15 kHz may be applied. The third BWP may span 20 MHz band and a subcarrier spacing of 60 kHz may be applied. The UE may configure at least one BWP among the 3 BWPs as an active BWP, and may perform UL and/or DL data communication via the active BWP.

A time resource may be indicated in a manner that indicates a time difference/offset based on a transmission time point of a PDCCH allocating DL or UL resources. For example, the start point of the PDSCH/PUSCH corresponding to the PDCCH and the number of symbols occupied by the PDSCH/PUSCH may be indicated.

Carrier aggregation (CA) is described. Like LTE/LTE-A, CA can be supported in NR. That is, it is possible to aggregate continuous or discontinuous component carriers (CCs) to increase the bandwidth and consequently increase the bit rate. Each CC may correspond to a (serving) cell, and each CC/cell may be divided into a primary serving cell (PSC)/primary CC (PCC) or a secondary serving cell (SSC)/ secondary CC (SCC).

Hereinafter, a method for generating a RS sequence according to an embodiment of the present invention is described.

The common PRB indexing may be defined for maximum number of PRBs for a given numerology. The maximum number of PRBs may be defined per numerology based on the maximum number of subcarriers that a UE supports. Because the maximum system bandwidth can be up to 400 MHz, which may exceed the maximum number of PRBs for certain numerologies, signaling details may need to be clarified.

Generally, it may be desirable to minimize signaling overhead. In other words, if a single value can be signaled for all numerologies, it may be more desirable. In this case, the value should be sufficiently large to cover the maximum system bandwidth which may exceed the maximum number of PRBs. Furthermore, for alignment among numerologies, in order to minimize the overhead of signaling, virtual PRB 0, instead of physical PRB 0, which can be outside of system bandwidth may be indicated. Thus, the offset value may be considerably large, and may be indicated as a number of PRBs based on numerology of the SS block, because the SS block is used as a reference to create PRB grid, i.e. common PRB indexing. As this may increase the overall number of PRBs for certain numerologies beyond its maximum capacity, separate offset per numerology may be configured. The separate offset per numerology may be signaled by UE-specific configuration when needed. If the numerology of the RMSI is different from the numerology of the SS block, the offset for the RMSI numerology may be indicated only.

In summary, a common offset among different numerologies may be indicated, or separate offset per numerology may be indicated. The offset for RMSI numerology may be given in RMSI, and other offsets may be indicated by UE-specific signaling.

Furthermore, forward compatibility when the maximum bandwidth is increased should be considered. This may be related to the above description, i.e. a UE can be indicated with a PRB which is beyond its maximum PRB. If the UE can be indicated with a PRB which is beyond its maximum PRB, what the maximum value a UE can expect is may be considered.

If larger maximum bandwidth is introduced in later releases, different common PRB indexing for Rel-15 UEs and future release UEs may be considered. Common PRB indexing has two main purposes. One is to indicate frequency location within a carrier and the other is to be used for potential RS sequence generation. For the first purpose, i.e. to indicate frequency location within a carrier, different PRB indexing may be used between UEs with different releases which may be ensured by the network. For the second purpose, i.e. to be used for RS sequence generation, if the network wants to multiplex UEs with different releases, it may be considered in future release UEs without impact backward compatibility. In this sense, any specific handling for forward compatibility regarding common PRB indexing may not be necessary.

However, in terms of RS sequence generation, more flexible approach may be preferred. That is, the network may configure length and/or offset of the RS sequence, and a UE may apply RS sequence mapping in its first PRB within its configured BWP, instead of assuming that RS sequence is generated based on common PRB indexing. The first motivation is to allow network flexibility in terms of RS generation. For example, multiple short sequences over system bandwidth, one long sequence, etc., may be generated based on configured length and/or offset of the RS sequence. The second motivation is to support potentially better forward compatibility. For example, if PRB 0 of a UE is different from PRB 0 of another UE while the network wants to multiplex them together, it may be preferable to generate RS sequence based on configured length and/or offset of the RS sequence, instead of common PRB indexing.

In summary, in terms of RS generation, instead of relying on common PRB indexing, additional configuration of length and/or offset of RS sequence may be supported. Based on additional configuration of length and/or offset of RS sequence, the UE may apply the mapping of RS sequence to its lowest PRB.

Figure 9:
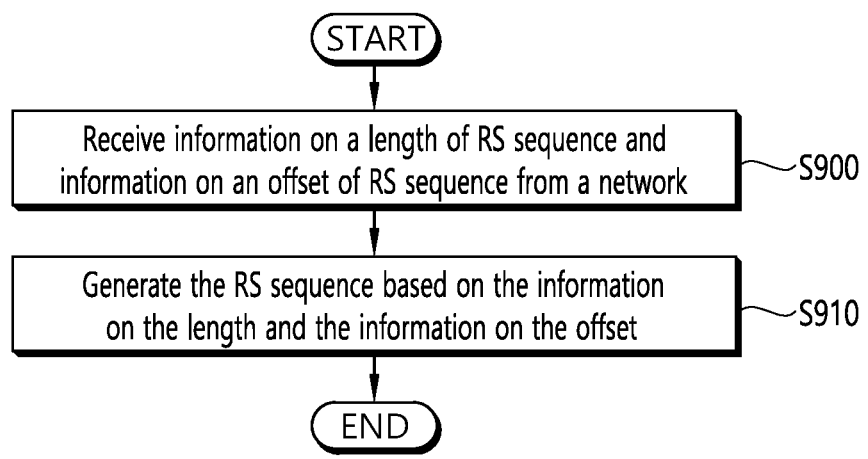
FIG. 9 shows a method for generating a RS sequence by a UE according to an embodiment of the present invention.

FIG. 9 shows a method for generating a RS sequence by a UE according to an embodiment of the present invention. The present invention described above for UE side may be applied to this embodiment.

In step S900, the UE receives information on a length of the RS sequence and information on an offset of the RS sequence from a network. In step S910, the UE generates the RS sequence based on the information on the length and the information on the offset.

The generating the RS sequence may comprise mapping the RS sequence in a first PRB within a configured BWP based on the information on the length and the information on the offset. The UE may transmit the RS sequence to the network.

Meanwhile, multiple RS sequences including the RS sequence may be generated over a system bandwidth. Furthermore, a PRB 0 of the UE may be different from a PRB 0 of another UE.

According to embodiment of the present invention shown in FIG. 9, the UE can generate the RS sequence based on the configured length and/or offset of the RS sequence, instead of common PRB indexing. According to the prior art, when the RS sequence is generated based on the common PRB indexing and the RS sequence is to be mapped to a portion which is relatively farther from the PRB 0 of the system bandwidth, the signaling overhead may occur. However, by generating the RS sequence based on the configured length and/or offset of the RS sequence, such signaling overhead can be avoided.

Figure 10:
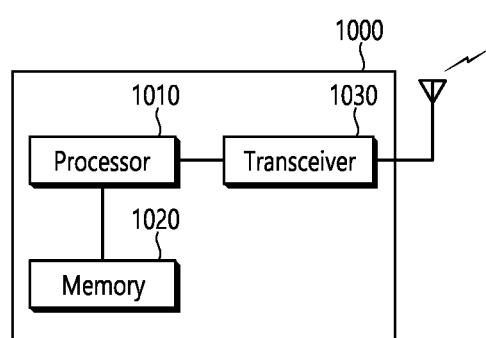
FIG. 10 shows a UE to implement an embodiment of the present invention.

FIG. 10 shows a UE to implement an embodiment of the present invention. The present invention described above for UE side may be applied to this embodiment.

A UE 1000 includes a processor 1010, a memory 1020 and a transceiver 1030. The processor 1010 may be configured to implement proposed functions, procedures and/or methods described in this description. Layers of the radio interface protocol may be implemented in the processor 1010. Specifically, the processor 1010 controls the transceiver 1030 to receive information on a length of a RS sequence and information on an offset of the RS sequence from a network, and generates the RS sequence based on the information on the length and the information on the offset.

The generating the RS sequence may comprise mapping the RS sequence in a first PRB within a configured BWP based on the information on the length and the information on the offset. The processor 1010 may control the transceiver 1030 to transmit the RS sequence to the network.

Meanwhile, multiple RS sequences including the RS sequence may be generated over a system bandwidth. Furthermore, a PRB 0 of the UE may be different from a PRB 0 of another UE.

The memory 1020 is operatively coupled with the processor 1010 and stores a variety of information to operate the processor 1010. The transceiver 1020 is operatively coupled with the processor 1010, and transmits and/or receives a radio signal.

According to embodiment of the present invention shown in FIG. 10, the processor 1010 can generate the RS sequence based on the configured length and/or offset of the RS sequence, instead of common PRB indexing. According to the prior art, when the RS sequence is generated based on the common PRB indexing and the RS sequence is to be mapped to a portion which is relatively farther from the PRB 0 of the system bandwidth, the signaling overhead may occur. However, by generating the RS sequence based on the configured length and/or offset of the RS sequence, such signaling overhead can be avoided.

Figure 11:
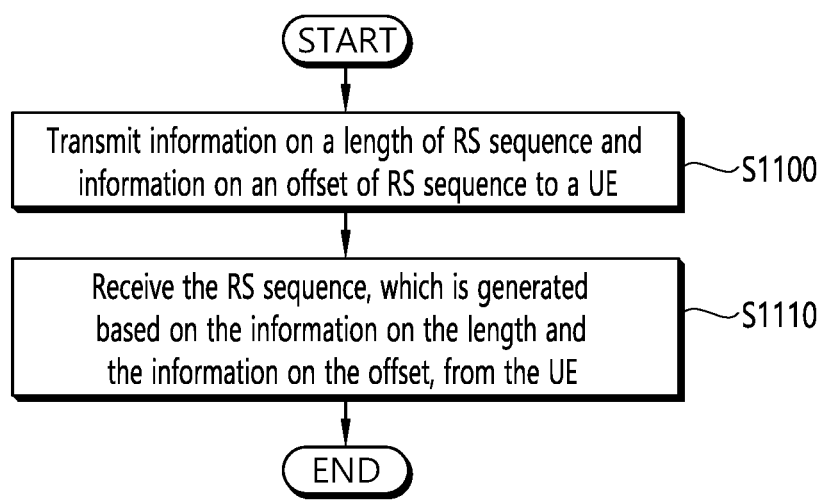
FIG. 11 shows a method receiving a RS sequence by a BS according to an embodiment of the present invention.

FIG. 11 shows a method receiving a RS sequence by a BS according to an embodiment of the present invention. The present invention described above for BS side may be applied to this embodiment.

In step S1100, the BS transmits information on a length of the RS sequence and information on an offset of the RS sequence to a UE. In step S1110, the BS receives the RS sequence, which is generated based on the information on the length and the information on the offset, from the UE.

The RS sequence may be mapped in a first PRB within a configured BWP based on the information on the length and the information on the offset. Multiple RS sequences including the RS sequence may be generated over a system bandwidth. A PRB 0 of the UE may be different from a PRB 0 of another UE.

According to embodiment of the present invention shown in FIG. 11, the network can flexibly configure the length and/or offset of the RS sequence. For example, the network may configure the UE to generate multiple short sequences over system bandwidth and/or one long sequence, etc. In addition, forward compatibility can be supported. For example, the network can multiplex UEs with different PRB 0.

Figure 12:
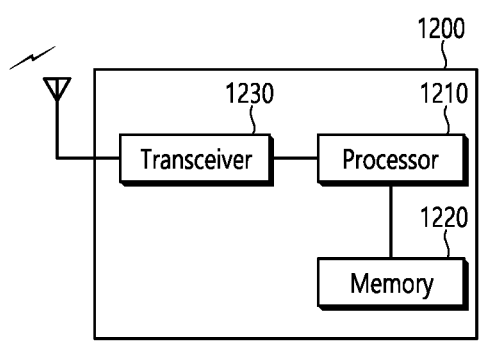
FIG. 12 shows a BS to implement an embodiment of the present invention.

FIG. 12 shows a BS to implement an embodiment of the present invention. The present invention described above for BS side may be applied to this embodiment.

A BS 1200 includes a processor 1210, a memory 1220 and a transceiver 1230. The processor 1210 may be configured to implement proposed functions, procedures and/or methods described in this description. Layers of the radio interface protocol may be implemented in the processor 1210. Specifically, the processor 1210 controls the transceiver 1230 to transmit information on a length of the RS sequence and information on an offset of the RS sequence to a UE, and to receive the RS sequence, which is generated based on the information on the length and the information on the offset, from the UE.

The RS sequence may be mapped in a first PRB within a configured BWP based on the information on the length and the information on the offset. Multiple RS sequences including the RS sequence may be generated over a system bandwidth. A PRB 0 of the UE may be different from a PRB 0 of another UE.

The memory 1220 is operatively coupled with the processor 1210 and stores a variety of information to operate the processor 1210. The transceiver 1220 is operatively coupled with the processor 1210, and transmits and/or receives a radio signal.

According to embodiment of the present invention shown in FIG. 12, the processor 1210 can flexibly configure the length and/or offset of the RS sequence. For example, the processor 1210 may configure the UE to generate multiple short sequences over system bandwidth and/or one long sequence, etc. In addition, forward compatibility can be supported. For example, the processor 1210 can multiplex UEs with different PRB 0.

The processors 1010, 1210 may include application-specific integrated circuit (ASIC), other chipset, logic circuit and/or data processing device. The memories 1020, 1220 may include read-only memory (ROM), random access memory (RAM), flash memory, memory card, storage medium and/or other storage device. The transceivers 1030, 1230 may include baseband circuitry to process radio frequency signals. When the embodiments are implemented in software, the techniques described herein can be implemented with modules (e.g., procedures, functions, and so on) that perform the functions described herein. The modules can be stored in memories 1020, 1220 and executed by processors 1010, 1210. The memories 1020, 1220 can be implemented within the processors 1010, 1210 or external to the processors 1010, 1210 in which case those can be communicatively coupled to the processors 1010, 1210 via various means as is known in the art.

Secondary cell (SCell) configuration and/or BWP activation according to an embodiment of the present invention is described.

When SCell is activated, it is necessary to allow DL and UL transmissions for any necessary functions. Even though expected UE behavior in SCell activation may need to be further discussed, generally, a UE is expected to be able to monitor control channels, and perform CSI feedbacks once SCell is activated. In that sense, it may be necessary to activate one DL BWP. For CSI feedback, as it may be done via PCell, activation of UL BWP seems not essential. However, if the SCell has its associated UL or a UE is expected to perform random access procedure on SCell during activation, activation of UL BWP seems necessary as well. In other words, at SCell activation, either DL only (i.e. only active DL BWP) or DL/UL (i.e. both DL/UL active BWP) may be configured. Regarding supplemental (SUL) band as a SCell, a UE may select default UL BWP based on measurement or the network may configure which one in its activation. In summary, in SCell activation, DL BWP may be activated only for DL only SCell, and DL/UL BWPs may be activated for DL/UL SCell.

Furthermore, for common PRB indexing in a SCell, it may be necessary to have a reference frequency location and/or offset between the reference frequency location and PRB 0. A simple approach is to configure the lowest frequency or center of default DL BWP as a reference frequency location, and indicate the offset from the PRB 0. Once a UE acquires common PRB indexing, common PRB indexing may be used for other configurations (including other BWP configurations). In summary, in common PRB indexing, a reference point to determine common PRB indexing may be derived based on default BWP configuration.

To support this, the configuration of default BWP may be configured with carrier/cell configuration.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by a user equipment (UE) in a wireless communication system, the method comprising:
   receiving, from a network, information on a length of a reference signal (RS) sequence and information on an offset of the RS sequences;
   performing an RS sequence mapping to map the RS sequence to a physical resource block 0 (PRB0) of the UE within a bandwidth part (BWP) based on the length of the RS sequence and the offset of the RS sequence; and
   transmitting, to the network, the RS sequence,
   wherein the length of the RS sequence and the offset of the RS sequence are used for the RS sequence mapping based on that:
   the PRB0 of the UE is different from that of another UE within the BWP so that a common PRB indexing is unused for the RS sequence mapping.

2. The method of claim 1, wherein multiple RS sequences including the RS sequence are generated over a system bandwidth.

3. The method of claim 1, wherein the UE is in communication with at least one of a mobile device, a network, and/or autonomous vehicles other than the UE.

4. A user equipment (UE) in a wireless communication system, the UE comprising:
   a memory;
   a transceiver; and
   at least one processor, operably coupled to the memory and the transceiver, configured to:
   control the transceiver to receive, from a network, information on a length of a reference signal (RS) sequence and information on an offset of the RS sequence,
   perform an RS sequence mapping to map the RS sequence to a physical resource block 0 (PRB0) of the UE within a bandwidth part (BWP) based on the the length of the RS sequence and the offset of the RS sequence, and
   control the transceiver to transmit, to the network, the RS sequence,
   wherein the length of the RS sequence and the offset of the RS sequence are used for the RS sequence mapping based on that:
   the PRB0 of the UE is different from that of another UE within the BWP so that a common PRB indexing is unused for the RS sequence mapping.

5. The UE of claim 4, wherein multiple RS sequences including the RS sequence are generated over a system bandwidth.

6. A method performed by a base station (BS) in a wireless communication system, the method comprising:
   transmitting, to a user equipment (UE) information on a length of a reference signal (RS) sequence and information on an offset of the RS sequence; and
   receiving, from the UE, the RS sequence,
   wherein the RS sequence is mapped to a physical resource block 0 (PRB0) of the UE within a bandwidth part (BWP) according to an RS sequence mapping, and
   wherein the length of the RS sequence and the offset of the RS sequence are used for the RS sequence mapping based on that:
   the PRB0 of the UE is different from that of another UE within the BWP so that a common PRB indexing is unused for the RS sequence mapping.

7. The method of claim 6, wherein multiple RS sequences including the RS sequence are generated over a system bandwidth.

* * * * *